UNITED STATES PATENT OFFICE.

PAUL WILSON TURNEY, OF RICHMOND, VIRGINIA.

PROCESS OF MAKING AND NEW FOOD PRODUCT OF MLIK.

1,289,021.  Specification of Letters Patent.  Patented Dec. 24, 1918.

No Drawing.  Application filed April 19, 1918. Serial No. 229,618.

*To all whom it may concern:*

Be it known that I, PAUL W. TURNEY, citizen of the United States of America, residing at Richmond, in the county of Henrico and State of Virginia, have invented certain new and useful Improvements in Processes of Making and New Food Product of Milk, of which the following is a specification.

My present invention relates to the process for making, and the milk-food product described in my application for Letters Patent of the United States, filed Mar. 22, 1917, Serial No. 156,783. The process there described, in short, may be said to consist of taking fresh milk, inducing the curdling thereof by an enzym, permitting the curdling to develop until the precipitate obtained will have a flocculent, slightly adhering consistency; then arresting further curdling by low temperature rapidly induced, permitting the casein precipitate to settle, and then pouring off the whey, and maintaining the stability of the precipitate by low temperature. I have, however, further discovered that said process and the product which it produces, may be modified and, for certain purposes the latter improved by returning thereto the poured-off whey, after the latter has been treated as hereinafter described. That is to say, the whey is reduced by evaporation to about one-fourth in bulk approximately and then is added to the casein precipitate, in this way increasing the bulk of the latter, and besides producing a very desirable product, when for example, the precipitate is to be used for producing an article simulating ice-cream.

Further, briefly describing the process which I follow in order to obtain the casein precipitate, the steps are as follows: I first heat the fresh milk, (skimmed or unskimmed, as desired) to from 80° to 100° F. in order to ripen it for curdling by the addition of an enzym. I then add the latter, using rennet or pepsin, and maintain said temperature during the curdling process so as to facilitate the coagulation of the casein. The curdling process is, however, permitted to develop only to that degree when the flocculent particles attain a tendency to stick together as may be readily ascertained by taking a sample between two fingers and separating them. The temperature of the milk must then be immediately lowered to approximately 45° F., so as to render the enzym inactive. During the rapid cooling of the milk it is necessary that the same be gently agitated for the purpose of breaking up the adhesion of the coagulated casein particles and thus releasing the whey. The mass is then allowed to stand for a time sufficient to permit the precipitate to settle,— the low temperature being maintained, the settling usually taking from two to twelve hours according to the degree of separation to be effected. Then the whey is poured off and concentrated by evaporation to one-fourth of its bulk, more or less; and finally the concentrated whey is returned to, and thoroughly intermixed with said precipitate. The resultant product must be kept at said low temperature until consumed, for if the temperature be permitted to rise, the enzym will again become active and soon render the product unfit for the uses mentioned.

I claim:

1. The process of making a milk food product consisting in taking fresh milk, inducing curdling thereof by an enzym, permitting the curdling to develop until the precipitate obtained will have a flocculent, slightly adherent consistency, then arresting further curdling by low temperature rapidly induced, gently agitating the mass to facilitate separation of the whey and permitting the precipitate to settle, then pouring off the whey, concentrating the latter, then returning the concentrated whey to and intermixing the same with said precipitate, and maintaining the stability of the product so obtained by low temperature.

2. The process of making a milk food product consisting in taking fresh milk, inducing curdling thereof by an enzym, permitting the curdling to develop until the precipitate obtained will have a flocculent, slightly adherent consistency, then arresting further curdling by low temperature rapidly induced, gently agitating the mass to facilitate separation of the whey and permitting the precipitate to settle, then pouring off the whey, concentrating the latter to one-fourth its bulk more or less, then returning the concentrated whey to and intermixing the same with said precipitate, and maintaining the stability of the product so obtained by low temperature.

3. A milk food product comprising a flocculent, slightly adherent fresh milk casein precipitate induced by an enzym, the action of which was arrested upon the precipitate becoming flocculent by an immediate reduction in temperature, and whey decanted from said precipitate, and concentrated, the whole being thoroughly intermixed and inhibited from change by being maintained at a low temperature.

4. A milk food product comprising a flocculent, slightly adherent fresh milk casein precipitate induced by an enzym, the action of which was arrested upon the precipitate becoming flocculent by an immediate reduction in temperature, and whey decanted from said precipitate, and concentrated to one-fourth in bulk, more or less, the whole being thoroughly intermixed and inhibited from change by being maintained at a low temperature.

In testimony whereof I affix my signature.

PAUL WILSON TURNEY.